(12) United States Patent
Wulff

(10) Patent No.: US 9,073,514 B2
(45) Date of Patent: Jul. 7, 2015

(54) SELF-LOCKING SEAT BELT RETRACTOR

(75) Inventor: Frank Wulff, Horst (DE)

(73) Assignee: AUTOLIV DEVELOPMENT AB, Vårgårda (SE)

( * ) Notice: Subject to any disclaimer, the term of this patent is extended or adjusted under 35 U.S.C. 154(b) by 422 days.

(21) Appl. No.: 13/388,314

(22) PCT Filed: Jul. 31, 2010

(86) PCT No.: PCT/EP2010/004693
§ 371 (c)(1),
(2), (4) Date: Feb. 1, 2012

(87) PCT Pub. No.: WO2011/015318
PCT Pub. Date: Feb. 10, 2011

(65) Prior Publication Data
US 2012/0126046 A1 May 24, 2012

(30) Foreign Application Priority Data

Aug. 7, 2009 (DE) .......................... 10 2009 036 516

(51) Int. Cl.
*B65H 75/48* (2006.01)
*B60R 22/40* (2006.01)

(52) U.S. Cl.
CPC ...................................... *B60R 22/40* (2013.01)

(58) Field of Classification Search
CPC ................. B60R 22/40; B60R 22/405; B60R 2022/3402
USPC ............ 242/379, 384.4–384.6; 280/806, 807; 297/478
See application file for complete search history.

(56) References Cited

U.S. PATENT DOCUMENTS

| | | | | |
|---|---|---|---|---|
| 4,467,981 A | * | 8/1984 | Mori et al. .................. | 242/384.4 |
| 4,603,819 A | * | 8/1986 | Loose et al. ................... | 242/379 |
| 4,747,562 A | * | 5/1988 | Tsukamoto et al. ....... | 242/382.2 |
| 5,209,421 A | * | 5/1993 | Fujiwara et al. ........... | 242/384.5 |
| 5,348,248 A | * | 9/1994 | Butenop .................... | 242/383.2 |

(Continued)

FOREIGN PATENT DOCUMENTS

| | | |
|---|---|---|
| DE | 43 02 707 A1 | 8/1993 |
| EP | 0 477 918 A1 | 9/1991 |

(Continued)

OTHER PUBLICATIONS

German Search Report—Apr. 28, 2010.
PCT International Search Report—Nov. 4, 2010.

*Primary Examiner* — Emmanuel M Marcelo
*Assistant Examiner* — Angela Caligiuri
(74) *Attorney, Agent, or Firm* — Brinks Gilson & Lione

(57) ABSTRACT

A self-locking seat-belt retractor for a vehicle has a U-shaped seat belt retractor frame (2) with two opposite frame pieces (2a, 2b) each with an opening (2c, 2d), in which a belt shaft (1) is rotatably mounted. A sensor device (3) is configured to actuate a locking device (4) to lock the belt shaft (1) if a predetermined vehicle deceleration is exceeded. A mass (6) is supported in a housing of the sensor device. The sensor device (3) with the housing (9) is held in a support element (7) mounted on the frame piece (2a) of the seat belt retractor frame (2). The support element (7) protrudes into an opening 25 on the frame piece (21) from one side with a portion receiving the sensor device (3). A cover element (11) closes the opening (25) from the other side of the frame piece (2a).

6 Claims, 5 Drawing Sheets

(56) References Cited

U.S. PATENT DOCUMENTS

| | | | |
|---|---|---|---|
| 5,482,224 A * | 1/1996 | Fujimura et al. | 242/376 |
| 5,882,084 A * | 3/1999 | Verellen et al. | 297/478 |
| 6,082,655 A * | 7/2000 | Verellen et al. | 242/379 |
| 2005/0205709 A1 | 9/2005 | Kohlndorfer | |
| 2009/0057471 A1 * | 3/2009 | Hiramatsu et al. | 242/396.1 |

FOREIGN PATENT DOCUMENTS

| | | |
|---|---|---|
| EP | 0 528 230 A2 | 7/1992 |
| EP | WO 2011/012222 A2 | 2/2011 |
| JP | 2003-212086 | 7/2003 |
| KR | WO2008/091059 A1 | 7/2008 |

* cited by examiner

SELF-LOCKING SEAT BELT RETRACTOR

CROSS REFERENCE TO RELATED APPLICATIONS

This application claims priority to German Patent Application No. 102009036516.8, filed Aug. 7, 2009, and PCT International Patent Application No. PCT/EP2010/004693, filed Jul. 31, 2010.

TECHNICAL FIELD OF THE INVENTION

The invention relates to a self-locking seat belt retractor for an automotive vehicle.

BACKGROUND OF THE INVENTION

A generic self-locking seat belt retractor for a motor vehicle is known from DE 10 2006 033 543 A1. The basic attempt is to keep the noise development in seat belt retractors as low as possible in order to meet the motor vehicle manufacturers' requirements, particularly for higher class motor vehicles. The vehicle-sensitive sensor device has proven to be an important source of noise in the seat belt retractor. The vehicle-sensitive sensor device has a mass supported in a housing that carries out small movements in the presence of vibrations and thus produces rattling noises. In order to solve this problem, it is proposed in DE 10 2006 0333 543 A1 to mount the vehicle-sensitive sensor in a floating manner in respect of the housing. The floating mount of the vehicle-sensitive sensor can, however, be problematic insofar as, for proper functionality, the vehicle-sensitive sensor must be arranged on the locking device and on the control device of the seat belt retractor with very high accuracy. The floating mount proposed for reducing the noise development should therefore not cause the deviation of the position of the sensor from the its specified position; consequently, the floating mount must be produced with very high accuracy. Furthermore, the floating mount must be made of a particular material, which has the necessary characteristics for implementing the floating mount. In general, the more complex production of the floating mount results in a more expensive seat belt retractor.

SUMMARY OF THE INVENTION

It is the object of the invention to create a self-locking seat belt retractor having a reduced noise development, wherein the reduction of the noise development should be implemented at the lowest possible cost.

In order to solve the problem, it is proposed according to the present invention that an opening is provided on the frame piece into which the support element protrudes from one side with a portion receiving the sensor device, and that a cover element is provided with which the opening is closed from the other side of the frame piece. Owing to the proposed solution the contact surface of the support element with the frame piece is substantially reduced, as a result of which the structure-borne noise that can be transmitted by the sensor device to the frame piece via the support element is substantially reduced. The cover element then covers the exposed surface of the support element and of the sensor device, respectively, and the propagated noise waves are dampened.

Furthermore, it is proposed that the cover element and/or the support element are shaped in such a way that a hollow space is formed between the cover element and the support element.

The structure-borne noise that can be transmitted from the support element to the cover element is further reduced by said hollow space. Furthermore, the sound waves propagated by the support element are additionally dampened in the hollow space.

It is further proposed that projections are provided on the support element and/or on the housing of the sensor device, which abut on the sensor device with the housing by forming a distance from a base area of the support element. Owing to the proposed projections, the sensor device with the housing only abuts on the support element via a very small surface, which substantially reduces the structure-borne noise that can be transmitted from the sensor device to the support element. As the projections are part of the support element and/or of the housing of the sensor device as such, said projections can be molded onto said elements in a cost-effective manner, e.g., by injection molding. In this way, neither the production costs nor the assembly costs of the self-locking seat belt retractor increase.

A further reduction of the noise development can be achieved by providing an opening in the support element between the projections. The surface of the support element is reduced by said opening, which transmits the noise produced by the sensor device to the outside. Furthermore, the direct connection between the projections can be interrupted by said opening, so that the structure-borne noise waves induced by the projections cannot mutually amplify or the mutual amplification is at least reduced.

It is further proposed that the support element comprises a frame having a square base area for receiving the sensor device, having inward-protruding lugs provided in the corners of the frame, on which the projections are arranged or which abut on the projections, and that the opening is arranged between the lugs and is configured cross-shaped. The proposed solution offers a stable support of the sensor device on the support element with, at the same time, as high an acoustic decoupling from the support element as possible. Furthermore, by arranging the lugs and the design of the opening, the size of said opening can be very large, without thereby deteriorating the mechanical support of the sensor device.

A particularly cost-effective embodiment of the invention consists in that the cover element and the frame piece are formed in one piece. In this case, the frame piece would be provided with a recess in the area in which the sensor device is arranged, said recess being shaped in such a way that the base area is arranged at a distance from the support element and/or from the sensor device.

The one-piece embodiment of the cover element with the frame piece can be implemented in a particularly cost-effective manner in that the frame piece is formed by stamping in the area of the cover element actually to be provided.

The invention is explained in more detail below with reference to a preferred exemplary embodiment. The description of the drawings is provided for purely illustrative purposes and not intended to limit the scope of the present invention.

DETAILED DESCRIPTION OF THE DRAWINGS

Figure 1:
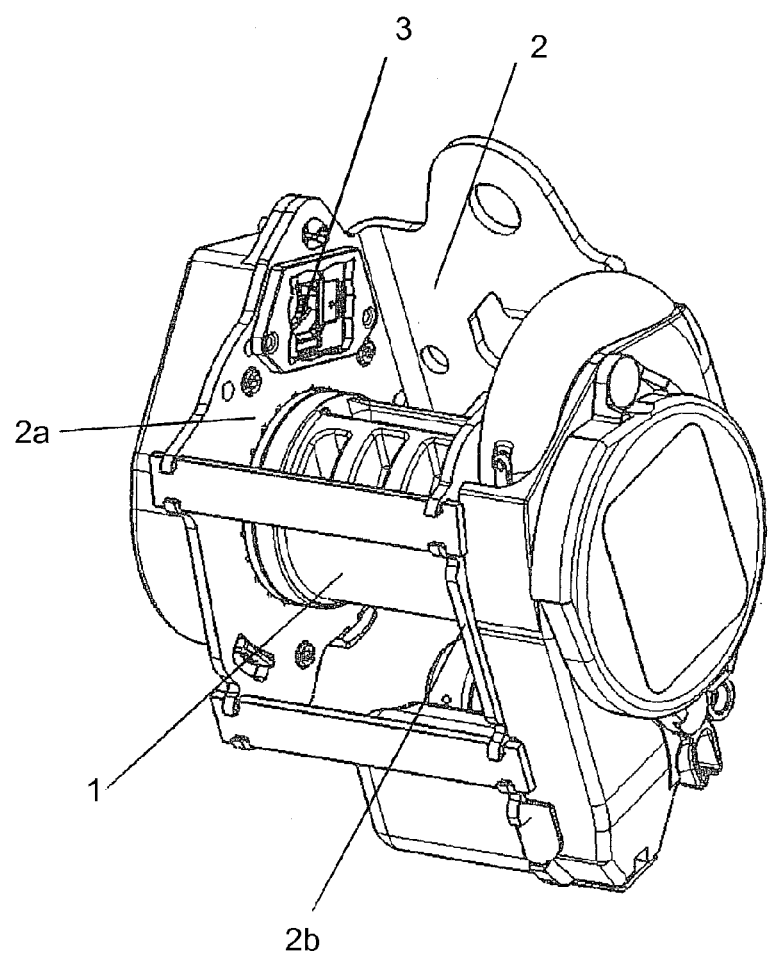
FIG. 1 shows an oblique view of a self-locking seat belt retractor.
Figure 2:
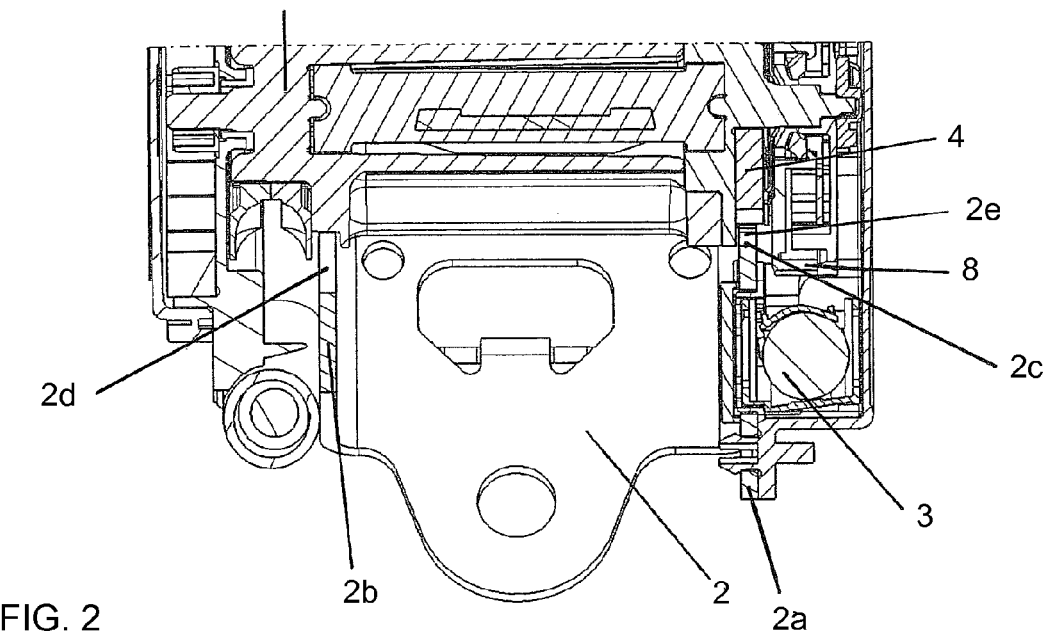
FIG. 2 shows a cross-sectional view of a self-locking seat belt retractor having a sensor device.

FIGS. 1 and 2 show a self-locking seat belt retractor comprising a U-shaped seat belt retractor frame 2 with two opposite frame pieces. The frame pieces 2a and 2b each have an opening 2c and 2d, through which a belt shaft 1 extends. A sensor device 3 having an inertial mass is arranged on the frame piece 2a, which actuates a locking device 4 in the form of a locking pawl mounted on the belt shaft 1 via a control disc 8 if a predetermined vehicle deceleration is exceeded. The exact interaction of the control disc 8 and the locking pawl is not described here in more detail, since said interaction is not of significance for the invention and can be assumed to be known in the prior art. A further sensor device is additionally provided in the seat belt retractor, which causes the seat belt retractor to be locked if a predetermined acceleration of the belt withdrawal is exceeded. Said belt strap-sensitive sensor device is not described here in more detail, since said device does not contribute to the invention. For that reason, within the meaning of this invention, the sensor device 3 always specifies the sensor device that senses the vehicle deceleration.

When the locking device 4 is actuated, the locking pawl engages in a serration 2e in the opening 2c of the frame piece 2a and thereby locks the belt shaft 1 in respect of the seat belt retractor frame 2 fixed to the vehicle.

Figure 3:
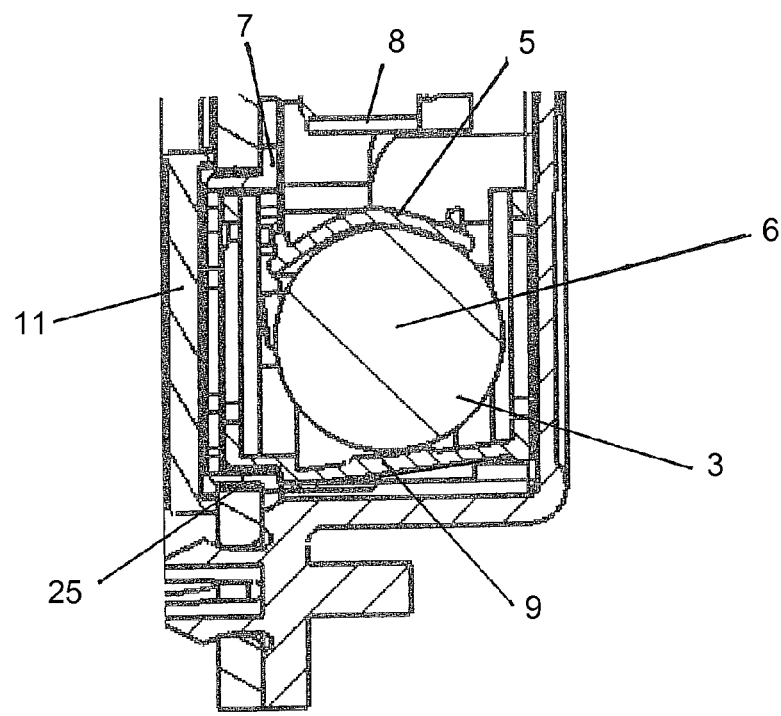
FIG. 3 shows an enlarged view of the sensor device.
Figure 4:
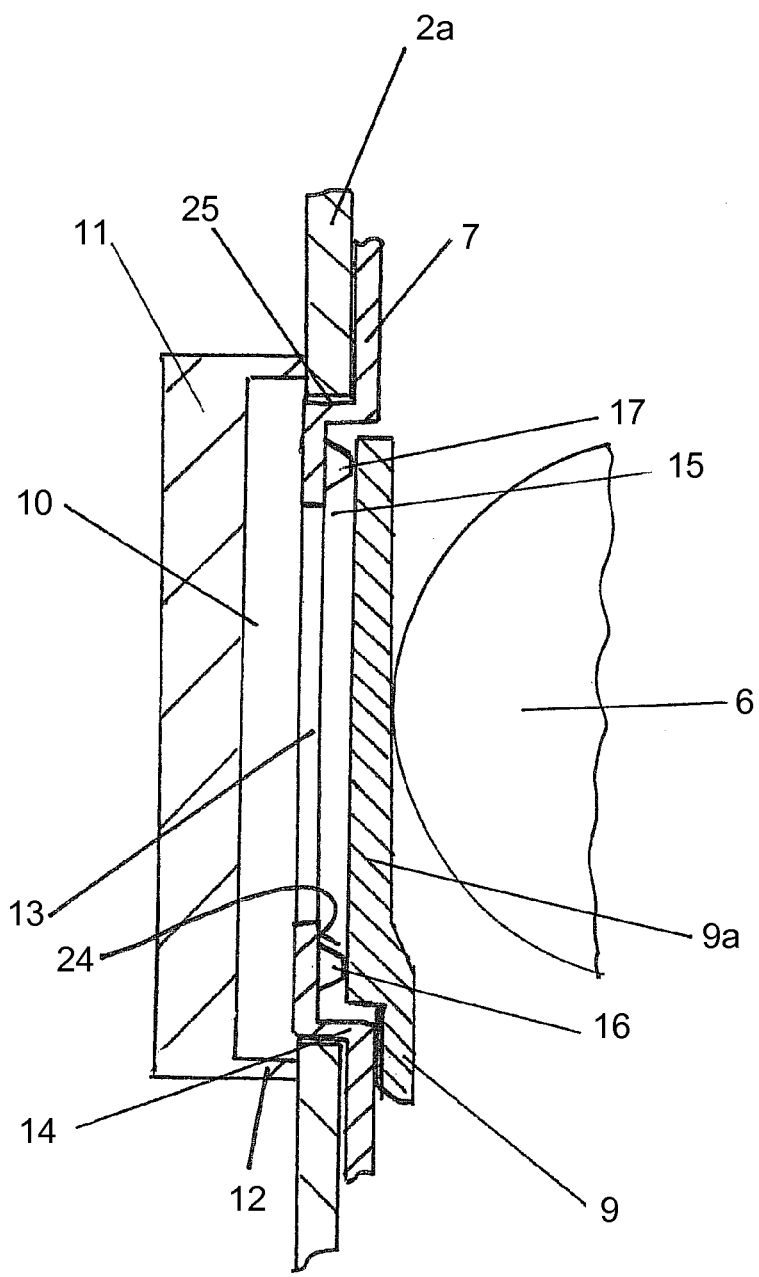
FIG. 4 shows an enlarged section of the support element comprising the sensor device.
Figure 5:
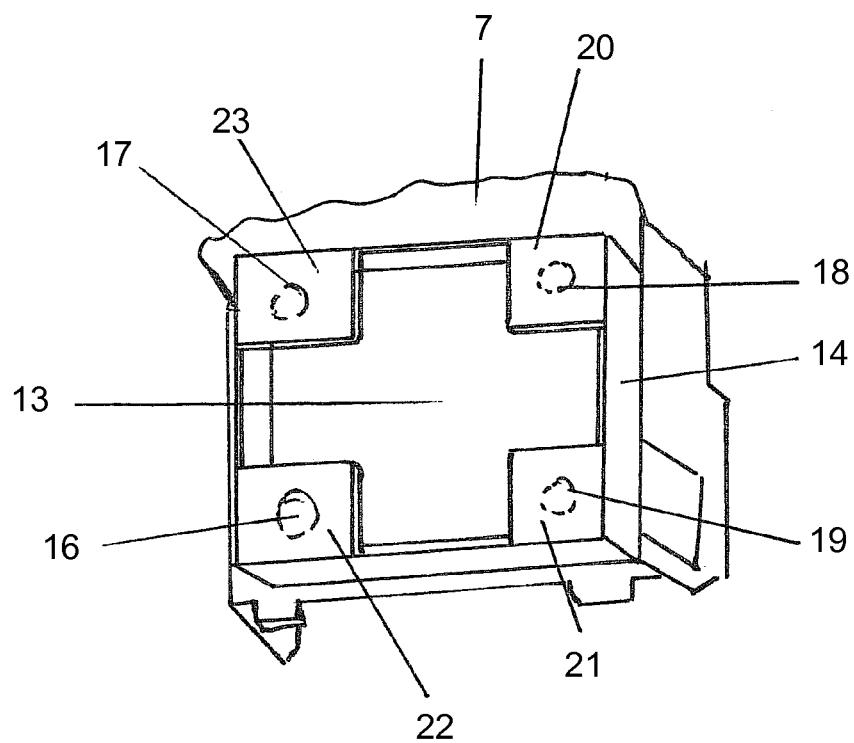
FIG. 5 shows a support element comprising a frame for receiving the sensor device and a cross-shaped opening.

FIGS. 3 and 4 show an enlarged representation of the sensor device 3. The sensor device 3 is formed by a housing 9, a spherical mass 6 supported in the housing 9, and a locking lever 5 that abuts on the mass 6. When the predetermined vehicle deceleration is exceeded, the mass 6 is deflected in the known manner and thereby lifts the locking lever 5, so that said locking lever engages in a serration of the control disc 8 and locks said disc in respect of the belt shaft 1. When the belt shaft 1 is turned again in the belt withdrawal direction, the locking device 4 is directly actuated owing to the stopped control disc 8 and locks the belt shaft 1 in the belt withdrawal direction while the locking pawl engages in the serration 2e. Furthermore, a support element 7 is provided that is fixed to the frame piece 2a and that comprises a square frame 14 for receiving the sensor device 3. As it also shown in FIG. 5, the square frame 14 has a cross-shaped opening 13, the design thereof being determined by the lugs 20, 21, 22 and 23 protruding inward from the corners of the frame 14. The lugs 20, 21, 22 and 23 define a base area 24, from which a cone-shaped projection 16, 17, 18 and 19 projects on each lug 20, 21, 22 and 23. The sensor device 3 abuts on the projections 16, 17, 18 and 19 of the support element 7 with a ledge 9a of the housing 9, so that the sensor device 3 comprising the housing 9 is held a distance 15 from the base area 24 of the support element 7.

Obviously, the housing 9 can abut on the support element 7 with the lateral surface of the frame 14, in order to fix the position of said support element. In this case, the abutment surface should be generally configured as small as possible. An opening 25 is provided in the frame piece 2a, into which the support element 7 protrudes with a portion formed by the frame 14. A cover element 11 is provided on the side of the frame piece 2a facing away from the sensor device 3, said cover element abutting on the frame piece 2a with a circumferential rim 12 and which comprises the opening 25. The cover element 11 covers both the opening 13 and the opening 25 in the frame piece 2a, and forms a hollow space 10 with the frame piece 2a owing to the edge 12 that abuts on the frame piece 2a.

The principle of noise reduction according to the present invention is based on the reduction of the abutment surface between the support element 7 and the frame piece 2a by the opening, so that the structure-borne noise that is transmitted to the frame piece 2a is reduced and the created exposed surface of the support element 7 is then covered by the cover element 11.

Figure 6:
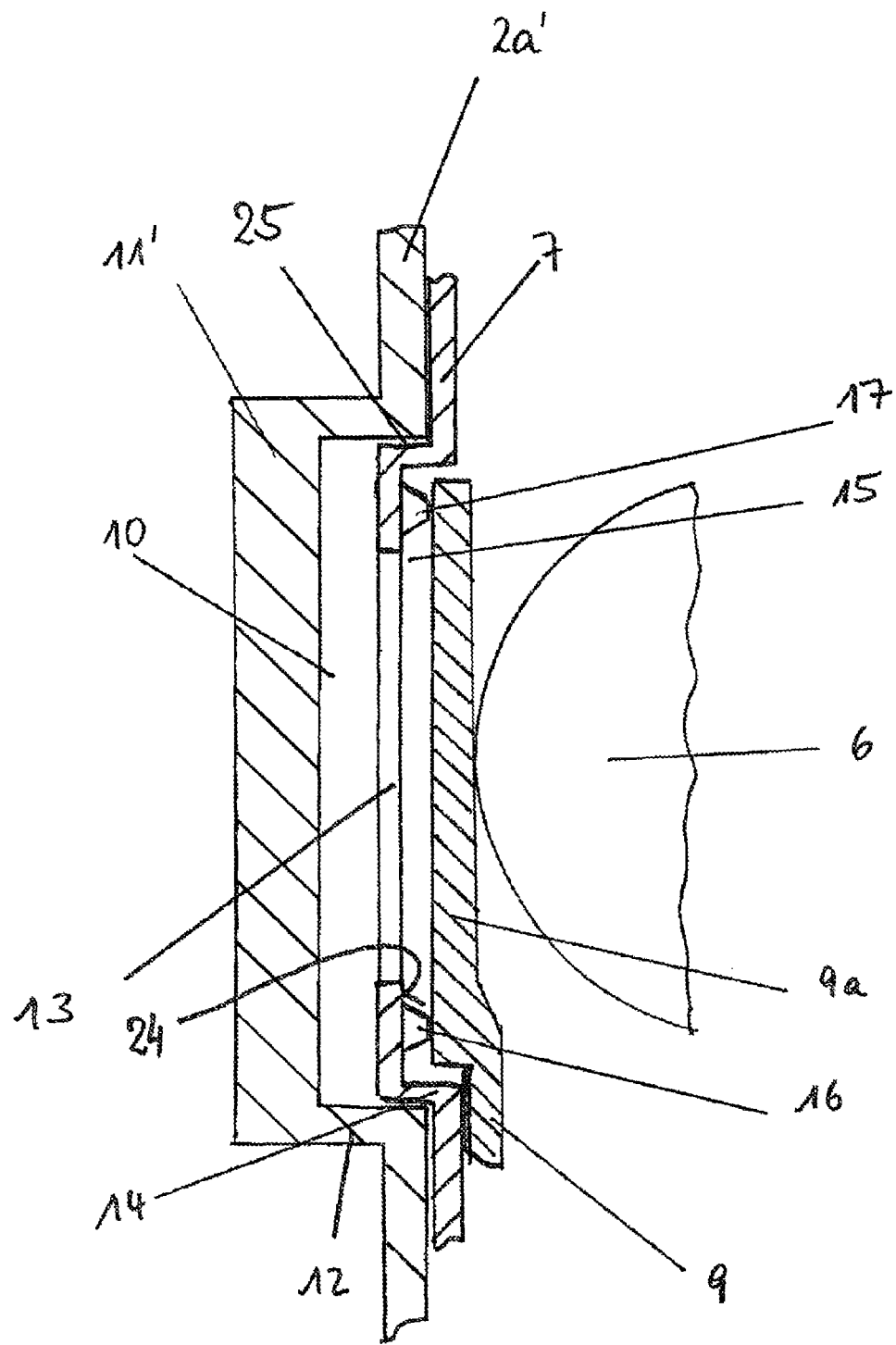
FIG. 6 shows the partial view of FIG. 4 in an alternative embodiment.

The cover element 11 is shaped by the circumferential rim 12 that is directed toward the frame piece such that a hollow space 10 is formed between the support element and the cover element 11. Owing to the hollow space 10 the support element 7 and the cover element 11 do not abut on one another or only abut on one another via a very small abutment surface. In the event that the cover element 11' is formed onto the frame piece 2a' in one piece as shown in FIG. 6, it is important that said cover element is configured as a recess, e.g., by stamping, and that the support element 7 only abuts on the frame piece 2a' via a contact surface that is as small as possible owing to the recess. A planar gap or hollow space is created by the recess between the frame piece 2a' and the support element 7, so that the structure-borne noise that can be transmitted is also reduced with such a solution.

A further noise reduction is achieved by the support element 7 being provided with the opening 13, so that the surface of the support element 7, from which the noise waves are propagated, is reduced. A further important measure for reducing the noise development is the abutment of the housing 9 on the projections 16, 17, 18 and 19 in a point suspension manner, so that the noise wave propagation is reduced as close as possible to the point of origin thereof.

The support element 7 can, at the same time, have a toothed ring comprising the control disc 8, said toothed ring being part of the above-mentioned sensor device for locking the belt shaft 1 in if the predetermined acceleration of the seat belt withdrawal is exceeded. In this case, the control disc 8 is stopped by another inertial mass supported on the control disc 8 being deflected and the control disc 8 being stopped by engaging in the toothed ring. With the toothed ring and the sensor device 3 the support element 7 thus comprises two substantial parts of the vehicle acceleration-sensitive and belt strap acceleration-sensitive sensor devices, which are fixedly allocated to one another so that, when assembling the seat belt retractor it must only be ensured that the support element 7 is arranged relative to the control disc 8 with the required accuracy for proper functionality.

All the proposed measures can be used both individually and in any combination to reduce the noise of the self-locking seat belt retractor, wherein the combination of all the proposed measures allows a maximum of noise reduction.

While the above description constitutes the preferred embodiment of the present invention, it will be appreciated that the invention is susceptible to modification, variation, and change without departing from the proper scope and fair meaning of the accompanying claims.

What is claimed is:

1. A self-locking seat belt retractor for a vehicle, comprising:
 a U-shaped seat belt retractor frame with two opposite frame pieces each with an aperture in which a belt shaft is rotatably mounted,
 a locking device with which the belt shaft can be locked in the belt extraction direction, a sensor device for actuating the locking device upon the vehicle exceeding a predetermined vehicle deceleration, the sensor device having a housing with a mass disposed in the housing, a bearing element mounted on one of the two opposite frame pieces of the seat belt retractor frame and protruding into an opening in the one of the two opposite frame pieces, in which bearing element the sensor device is mounted with the housing, the bearing element having a base with a base area extending in a plane parallel to the one of the two opposite frame pieces, with a plurality of elevations on one of the base area of the bearing element and the housing of the sensor device, the elevations abutting the other one of the housing and the base area of the bearing element, thereby forming a distance between the housing and the base area of the bearing element, wherein the bearing element extends into the opening in the one of the two opposite frame pieces from one side with a portion of the bearing element holding the sensor device, and a cover element with which the opening is closed from the other side of the one of the two opposite frame piece.

2. The self-locking seat belt retractor according to claim 1, wherein the cover element and the bearing element are shaped in such a way that a hollow space is formed between the cover element and the bearing element.

3. The self-locking seat belt retractor according to claim 1, further comprising an opening in the bearing element between the elevations.

4. The self-locking seat belt retractor according to claim 1, wherein the cover element and the two opposite frame pieces are unitarily formed.

5. The self-locking seat belt retractor according to claim 4, wherein the cover element and the two opposite frame pieces are unitarily stamped.

6. A self-locking seat belt retractor for a vehicle, comprising:

a U-shaped seat belt retractor frame with two opposite frame pieces each with an aperture in which a belt shaft is rotatably mounted, a locking device with which the belt shaft can be locked in the belt extraction direction, a sensor device for actuating the locking device upon the vehicle exceeding a predetermined vehicle deceleration, the sensor device having a housing with a mass disposed in the housing, and a bearing element mounted on one of the two opposite frame pieces of the seat belt retractor frame, in which bearing element the sensor device is mounted with the housing, an opening on one of the two opposite frame pieces, into which opening the bearing element extends from one side with a portion of the bearing element holding the sensor device, and a cover element with which the opening is closed from the other side of the one of the two opposite frame pieces, wherein the bearing element includes a bearing element frame having a square base area for mounting the sensor device, and inward-projecting projections in corners of the bearing element frame, and wherein elevations are located on the projections or configured to come into contact with the projections, and wherein an opening is located between the projections and has a cross-like shape.

\* \* \* \* \*